(12) United States Patent
Shibayama

(10) Patent No.: US 7,439,998 B2
(45) Date of Patent: Oct. 21, 2008

(54) OPTICAL RECORDING APPARATUS

(75) Inventor: Yasuyuki Shibayama, Hitachinaka (JP)

(73) Assignee: Ricoh Printing Systems, Ltd., Tokyo (JP)

( * ) Notice: Subject to any disclaimer, the term of this patent is extended or adjusted under 35 U.S.C. 154(b) by 0 days.

(21) Appl. No.: 11/748,110

(22) Filed: May 14, 2007

(65) Prior Publication Data

US 2007/0274639 A1 Nov. 29, 2007

(30) Foreign Application Priority Data

May 16, 2006 (JP) .......................... P2006-134874
Mar. 23, 2007 (JP) .......................... P2007-076183

(51) Int. Cl.
*G02B 6/06* (2006.01)
*B41J 15/14* (2006.01)
*B41J 27/00* (2006.01)
*B41J 2/455* (2006.01)

(52) U.S. Cl. ........................ 347/241; 347/243; 347/233; 385/119

(58) Field of Classification Search ................. 347/224, 347/225, 233, 234, 241, 243, 248, 256, 258–261; 385/115, 116, 119, 125; 355/1; 399/219

See application file for complete search history.

(56) References Cited

U.S. PATENT DOCUMENTS 6,243,522 B1 * 6/2001 Allan et al. .................. 385/123

6,836,278 B2 * 12/2004 Saito et al. .................. 347/233
2004/0213130 A1 10/2004 Kataoka et al.

FOREIGN PATENT DOCUMENTS

| JP | 2000 147296 | 5/2000 |
|---|---|---|
| JP | 2001 066438 | 3/2001 |
| JP | 2004 325859 | 11/2004 |

\* cited by examiner

*Primary Examiner*—Kevin S Wood
*Assistant Examiner*—John M Bedtelyon
(74) *Attorney, Agent, or Firm*—Whitham Curtis Christofferson & Cook, PC

(57) ABSTRACT

An optical recording apparatus includes a plurality of laser modules, an optical fiber array unit, a photosensitive member, and an optical system. Each laser module includes a light source and an optical fiber. The optical fiber array unit bundles a plurality of optical fibers to form an optical fiber array. The photosensitive member has a photosensitive surface. The optical system scans laser beams outputted from the array of the optical fiber array in a first direction on the photosensitive surface, the laser beams forming dots aligned in a second direction to form an angle with respect to the first direction. A relationship of $2\omega_F > 2\omega_D(P_F/P_D)\sin[\tan^{-1}(2m\cdot\Delta\theta)]$ is established, where $2\omega_F$ is a mode field diameter of the laser beams outputted from the optical fiber array, $2\omega_D$ is a spot diameter of the laser beams on the scanning surface, $P_F$ is a pitch of the output faces of the optical fibers, $P_D$ is a pitch of scan lines on the scanning surface, m is the number of the laser beams, and $\Delta\theta$ is adjusting resolution for the angle of the array of the laser beams on the scanning surface.

7 Claims, 4 Drawing Sheets

OPTICAL FIBER ARRAY

BEAM SPOTS FOCUSED ON SCANNING SURFACE

FIG.5A
FIG.5B
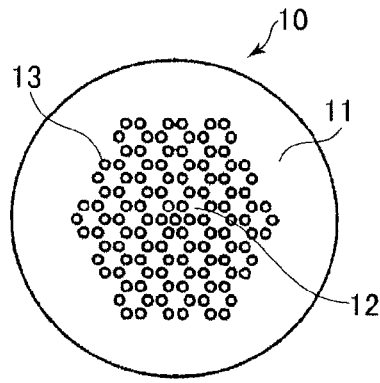
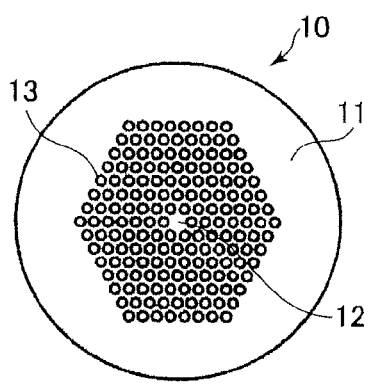
FIG.6
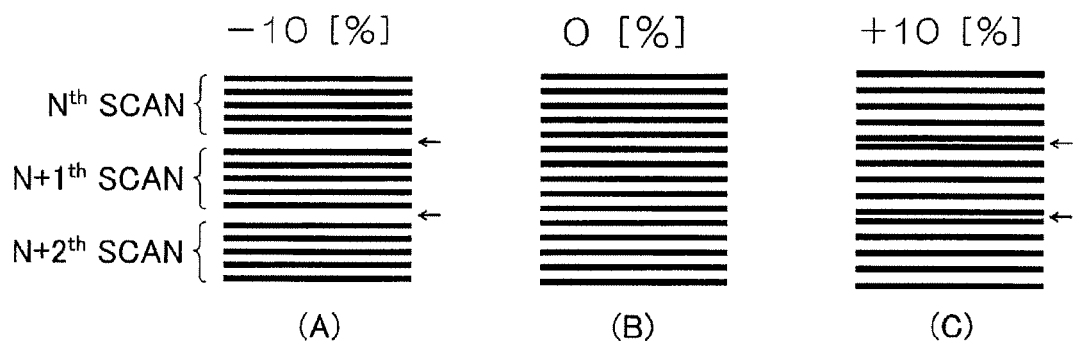
FIG.7
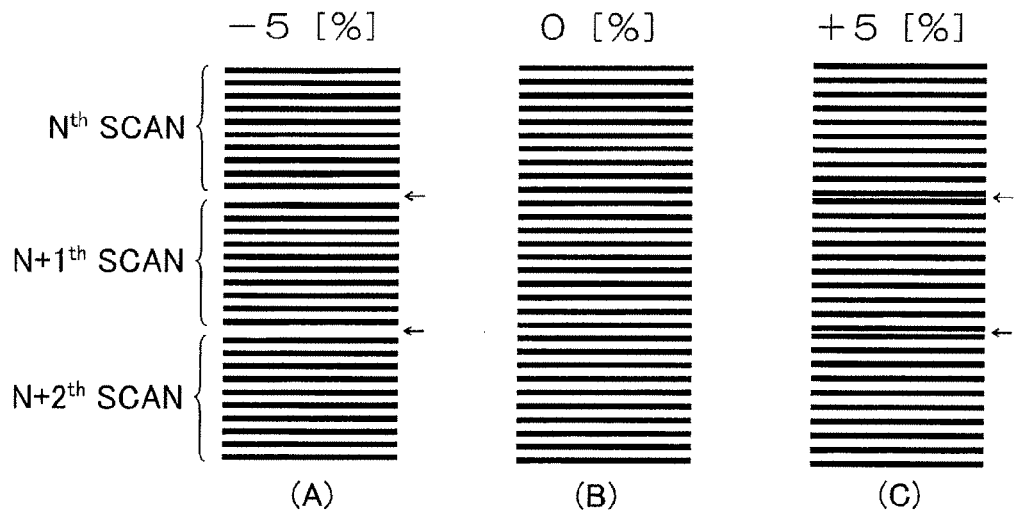

OPTICAL RECORDING APPARATUS

BACKGROUND OF THE INVENTION

1. Field of the Invention

The present invention relates to an optical recording apparatus, such as a laser printer, for emitting laser beams from light sources, and deflecting and scanning the laser beams for optically recording an image.

2. Description of the Related Art

A laser printer or other conventional optical recording apparatus, such as that disclosed in Japanese Patent Application Publication No. 2004-325859, is configured to guide a laser beam to an optical fiber array having a plurality of optical fibers, and to focus and scan the laser beams emitted from the optical fiber array on a scanning surface. In this type of apparatus, the optical fiber array and the scanning surface are arranged in an optical conjugate. Since the pitch of beam spots focused on the scanning surface is greater than the pitch of adjacent scan lines, a row of beam spots is focused on the scanning surface at a slant when scanned to form scan lines.

FIG. 1 shows the relationship of this optical fiber array and the beam spots focused on the scanning surface. In FIG. 1, $2\omega_F$ is the mode field diameter of the laser beam emitted from each optical fiber in the array; $P_F$ is the pitch of optical fibers forming the optical fiber array; $2\omega_D$ is the spot diameter of the beam spots focused on the scanning surface (while the actual spot diameter varies according to the magnitude of aberration in the optical system, spot diameter denotes the diffraction-limited spot diameter in this case); $P_D$ is the pitch of scan lines on the scanning surface; M is the magnification of the optical system; and $\theta$ is the sloped angle of the row of beam spots focused on the scanning surface. The mode field diameter described above is the size (full width) of $1/e^2$ the central light intensity (13.5%) for the light intensity distribution of beams propagated over the optical fibers. Below, $P_D$ and $2\omega_D$ are represented in Equations (1) and (2).

Equation (1)

$$P_D = M P_F \cdot \sin\theta \quad (1)$$

Equation (2)

$$2\omega_D = 2\omega_F \cdot M \quad (2)$$

If $2\omega_F$ is 3.5 μm, $P_F$ is 125 μm, $2\omega_D$ is 50 μm, and $P_D$ is 21.2 μm when using a short-wavelength semiconductor laser having no greater than a 450-nm wavelength as the light source, we obtain M=12.5 times and $\theta$=0.680° from Equations (1) and (2).

From Equation (1), it is clear that error in the sloped angle $\theta$ of the beam spots focused on the scanning surface result in error of the scanning line pitch $P_D$ on the scanning surface. Further, the smaller the sloped angle $\theta$, the smaller the allowable error. In the above example, an error in the sloped angle $\Delta\theta$=±0.0068° corresponds to an error of ±1% in the PD. Therefore, it is necessary to achieve rigorous precision in the sloped angle $\theta$ to suppress error in the scan line pitch.

Next, a method will be described for alleviating the sensitivity of the scan line pitch error $\Delta P_D$ which corresponds to the sloped angle error $\Delta\theta$ of the beam spots on the scanning surface.

One such method is to increase the sloped angle $\theta$ of beam spots formed on the scanning surface. From Equation (1), the pitch $P_F$ of optical fibers in the optical fiber array may be reduced to increase the sloped angle $\theta$.

Generally, optical fibers have a two-layered structure including an outer peripheral portion called a clad formed primarily of quartz glass, and a center portion called a core formed by doping the quartz glass with germanium. Since the size of the light-propagating region (core) of the optical fiber is normally smaller than the clad portion, Japanese Patent Application Publication No. 2000-147296 discloses a method of reducing the $P_F$ in the optical fiber array by etching the outer diameter of the clad portion in the optical fibers. However, thinning the clad portion by etching the outer diameter thereof invites irregularities in the thickness of the clad portion. A method of bonding or the like thinned clad parts to a groove-shaped substrate, such as that disclosed in Japanese Patent Application Publication No. 2001-066438, for fixing optical fibers has poor workability in forming an optical fiber array. Another method well known in the art adjusts the rotation of the optical fibers as a preliminary step to fixing the fibers in order to arrange the core part along a straight line, but this method also results in poor workability.

Another method for reducing error in the scan line pitch $P_D$ caused by sloped angle error $\Delta\theta$ uses means to reduce the magnification M of the optical system. However, as can be seen from Equation (2), the magnification M of the optical system is a coefficient associated with the mode field diameter $2\omega_F$ of beams emitted from the optical fibers and the spot diameter $2\omega_D$ for the beam spots focused on the scanning surface and, hence, $2\omega_D$ is reduced when reducing M. To avoid this problem, a method well known in the art provides the optical system with an aperture member for focusing the beams. However, the aperture member blocks portions of the beams, resulting in loss of light quantity.

Vertical cavity surface emitting lasers (VCSEL) don't have a large output and cannot produce a short-wavelength laser at the present moment. Specifically, the wavelength of a vertical cavity surface emitting laser is limited to the near-infrared range (about 780 nm), giving the optical power per element an upper limit of a few mW (2-3 mW).

In contrast, blue (405 nm wavelength) and red (633-680 nm wavelength) edge-emitting lasers have been produced with a power per element of 30-60 mW. Accordingly, edge-emitting lasers provide more freedom in selecting wavelengths and are superior to surface-emitting lasers as a high-power light source. However, as described above, it is very difficult to remove the effects of the error $\Delta\theta$ in the sloped angle of beam spots focused on the scanning surface in edge-emitting lasers, which is the greatest technological problem in optical elements combining edge-emitting lasers and optical fiber arrays.

SUMMARY OF THE INVENTION

In view of the foregoing, it is an object of the present invention to provide an optical recording apparatus using an edge-emitting laser as the light source and including an optical scanner with low error in scan line pitch on the scanning surface caused by the $\Delta\theta$ in the sloped angle of the row of beam spots focused on the scanning surface.

This and other objects of the invention will be attained by an optical recording apparatus including a plurality of laser modules, an optical fiber array unit, a photosensitive member, and an optical system. Each laser module includes a light source that generates a laser beam and an optical fiber having an incident face and an output face. The optical fiber is arranged to receive the laser beam at the incident face. The optical fiber array unit bundles a plurality of optical fibers configuring the plurality of laser modules to form an optical fiber array wherein the plurality of optical fibers is arranged to have an array of output faces arranged at a constant pitch. The photosensitive member has a photosensitive surface. The optical system scans laser beams outputted from the array of output faces of the optical fiber array in a first direction on the photosensitive surface. The laser beams form dots aligned in a second direction to for an angle with respect to the first direction. A relationship of $2\omega_F > 2\omega_D(P_F/P_D)\sin[\tan^{-1}(2m\cdot\Delta\theta)]$ is established, where $2\omega_F$ is a mode field diameter of the laser beams outputted from the optical fiber array, $2\omega_D$ is a spot diameter of the laser beams on the scanning surface, $P_F$ is a pitch of the output faces of the optical fibers, $P_D$ is a pitch of scan lines on the scanning surface, m is the number of the laser beams, and $\Delta\theta$ is adjusting resolution for the angle of the array of the laser beams on the scanning surface.

In another aspect of the invention, there is provided an optical recording apparatus including a plurality of laser modules, an optical fiber array unit, a photosensitive member, and an optical system. Each laser module includes a light source that generates a laser beam and an optical fiber having an incident face and an output face. The optical fiber is arranged to receive the laser beam at the incident face. The optical fiber array unit bundles a plurality of optical fibers configuring the plurality of laser modules to form an optical fiber array wherein the plurality of optical fibers is arranged to have an array of output faces arranged at a constant pitch. The photosensitive member has a photosensitive surface. The optical system scans laser beams outputted from the array of output faces of the optical fiber array in a first direction on the photosensitive surface. The laser beams form dots aligned in a second direction to for an angle with respect to the first direction. A relationship of $2\omega_F > 2\omega_D(P_F/P_D)\sin[\tan^{-1}(2m\cdot 0.0017)]$ is established, where $2\omega_F$ is a mode field diameter of the laser beams outputted from the optical fiber array, $2\omega_D$ is a spot diameter of the laser beams on the scanning surface, $P_F$ is a pitch of the output faces of the optical fibers, $P_D$ is a pitch of scan lines on the scanning surface, m is the number of the laser beams, and 0.0017 is the value of the adjusting resolution $\Delta\theta$ for the angle of the array of the laser beams on the scanning surface.

In another aspect of the invention, there is provided an optical recording apparatus including a plurality of laser modules, an optical fiber array unit, a photosensitive member, and an optical system. Each laser module includes a light source that generates a laser beam and an optical fiber having an incident face and an output face. The optical fiber is arranged to receive the laser beam at the incident face. The optical fiber is a single-mode optical fiber formed from photonic crystals. The optical fiber array unit bundles a plurality of optical fibers configuring the plurality of laser modules to form an optical fiber array wherein the plurality of optical fibers is arranged to have an array of output faces arranged at a constant pitch. The photosensitive member has a photosensitive surface. The optical system scans laser beams outputted from the array of output faces of the optical fiber array in a first direction on the photosensitive surface.

BRIEF DESCRIPTION OF THE DRAWINGS

In the drawings:

FIG. 5A is a cross-sectional view of a photonic crystal fiber according to the preferred embodiment;

FIG. 5B is a cross-sectional view of another photonic crystal fiber according to the preferred embodiment;

FIG. 6 is an explanatory diagram illustrating the effects on error in scan line pitch in a five-beam optical scanning system; and FIG. 7 is an explanatory diagram illustrating the effects on error in scan line pitch in a ten-beam optical scanning system.

DESCRIPTION OF THE PREFERRED EMBODIMENTS

Figure 1:
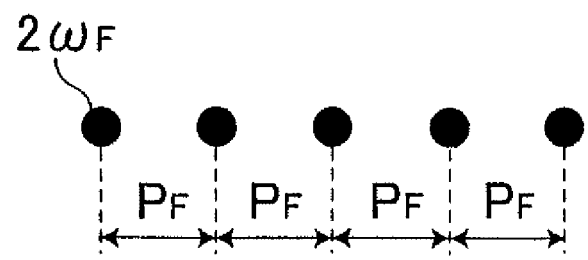
FIG. 1 is an explanatory diagram showing an optical fiber array and a row of beam spots on a scanning surface.
Figure 1:
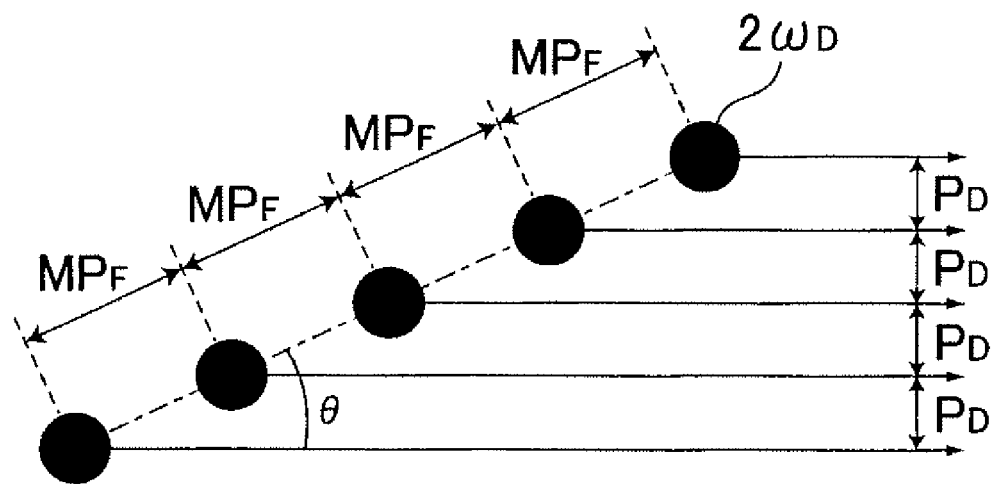
Figure 2:
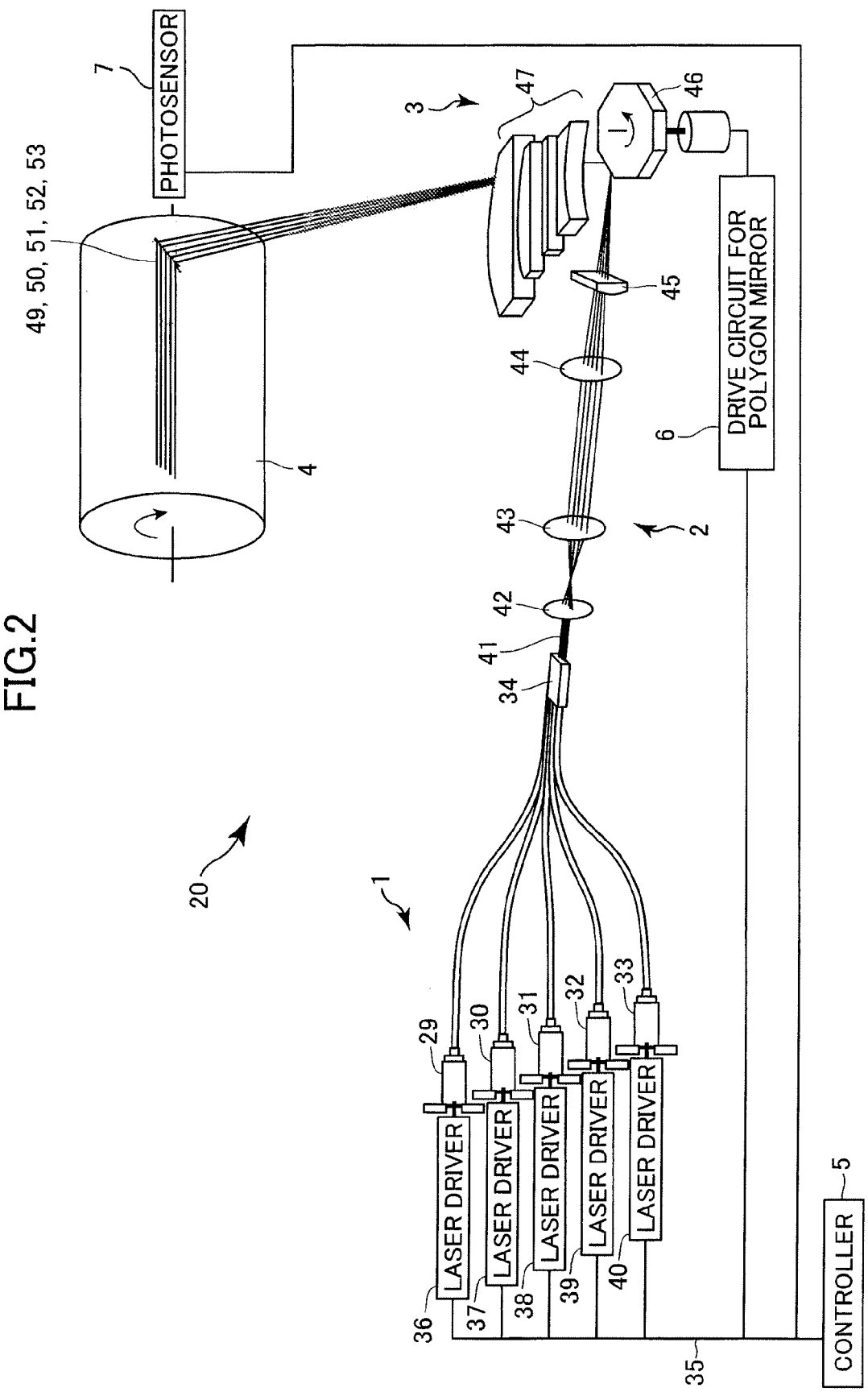
FIG. 2 is a schematic diagram showing an optical recording apparatus according to the preferred embodiment of the present invention.

Next, an example of an optical recording apparatus according to the present invention will be described with reference to FIG. 2. As shown in FIG. 2, an optical recording apparatus 20 according to the preferred embodiment includes a light source section 1, a lens system 2, a scanning section 3, a photosensitive drum 4 functioning as a recording section, and a controller 5.

The light source section 1 includes five independent semiconductor laser modules 29-33, and corresponding laser drivers 36-40. The controller 5 controls each of the laser drivers 36-40.

Figure 3:
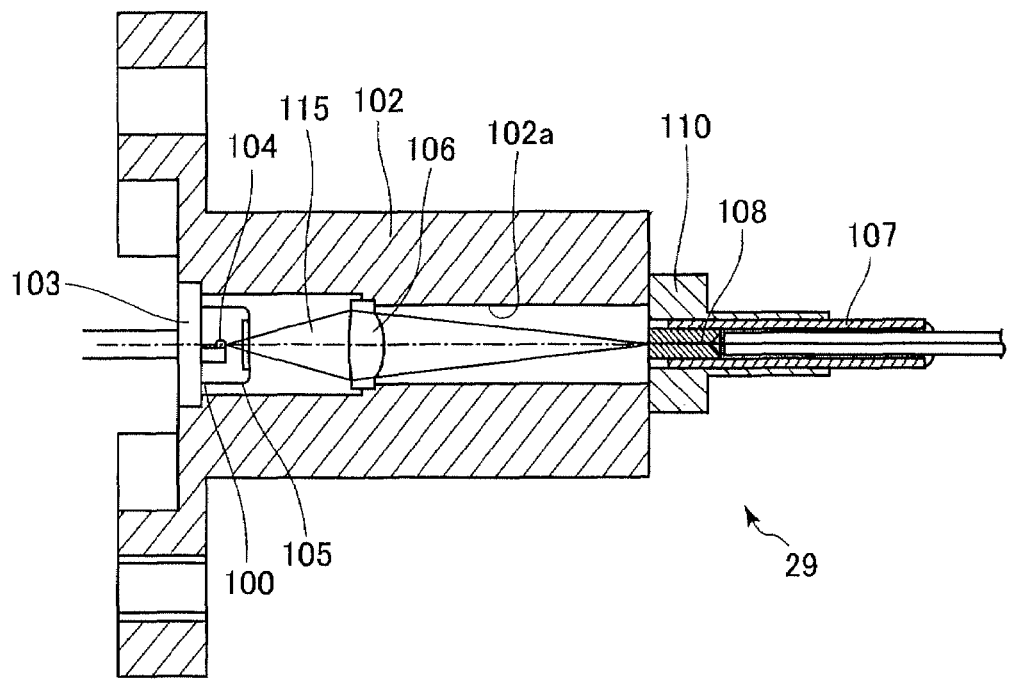
FIG. 3 is a cross-sectional view of a semiconductor laser module.

FIG. 3 shows the cross-sectional structure of the semiconductor laser module 29. As shown in FIG. 3, a semiconductor laser module 20 has a laser retainer 102 with a through-hole 102a formed through the center thereof. The semiconductor laser 100 is disposed on the rear end of the laser retainer 102 blocking the through-hole 102a. The semiconductor laser 100 employs an edge emitting semiconductor laser that emits a beam from a vertical cleaved surface onto an active layer. The semiconductor laser 100 includes a laser chip 104, a laser diode cap 105, and a stem 103. The laser chip 104 emits a laser beam. The stem 103 is disc-shaped and is bonded to the laser retainer 102 by laser welding the entire periphery thereof to form a hermetic seal within the through-hole 102a on the rear end of the laser retainer 102.

The laser chip 104 and a light-detecting element (not shown) for receiving the laser beam are hermetically sealed within a space defined by the laser diode cap 105 and stem 103. A lens 106 is disposed inside the through-hole 102a on the front side of the semiconductor laser 100. A sleeve 110 is fixed to the front end of the laser retainer 102.

A cylindrical ferrule 107 is inserted into the sleeve 110. A single-mode optical fiber 108 is inserted into the ferrule 107 and held thereby. A beam 115 emitted from the laser chip 104 is focused on a light-incident endface of the optical fiber 108 through the lens 106 and enters the light-propagating region (hereinafter referred to as "core") of the optical fiber 108.

The semiconductor laser 100 preferably produces a short-wavelength beam of no greater than 450 nm. The semiconductor laser and optical coupling system are packaged as each of the semiconductor laser modules 29-33.

The exit ends of optical fibers in the semiconductor laser modules 29-33 are arranged adjacent to one another in a single line, forming an optical fiber array unit 34. The optical fiber array unit 34 functions as a light source capable of generating a plurality of laser beams. The controller 5 issues image data signals 35 for controlling semiconductor lasers integrated in the individual semiconductor laser modules 29-33. Hence, the optical fiber array unit 34 can emit individual beams 41 that have been individually modulated from the leading end thereof.

The laser beams emitted from the optical fiber array unit 34 pass through a lens 42 for shaping the beams so that the beams emitted from each optical fiber are substantially parallel to one another. The parallel beams subsequently pass sequentially through lenses 43, 44, and 45 and are deflected by a rotating polygon mirror 46. The polygon mirror 46 is driven to rotate by a drive circuit 6 controlled according to control signals outputted from the controller 5. Laser beams deflected by the polygon mirror 46 is are focused on the photosensitive drum 4 as a row of beam spots 49-43 by a scanning lens 47 functioning as an optical imaging element. By scanning the individually modulated beams spots 49-53 over the photosensitive drum 4 in this way, optical recording is performed on the surface of the photosensitive drum 4. A photodetector 7 is disposed adjacent to the photosensitive drum 4 and inputs detection signals to the controller 5.

A feature of the optical recording apparatus 20 described above is that the optical fibers constituting the optical fiber array unit 34 in the preferred embodiment are single-mode optical fibers configured of photonic crystal fibers described below.

In single-mode optical fibers, the far-field pattern of beams emitted from the optical fibers has a single-peak circular or elliptic Gaussian power distribution. Normally, optical fibers have a two-layered structure including an outer peripheral portion called a clad that is formed primarily of quartz glass, and a center portion called a core that is formed by doping the quartz glass with germanium. Optical fibers having a core diameter of about 10 μm are employed in single-mode optical fibers used for optical communications whose semiconductor lasers have a wavelength of 1.3 μm or 1.5 μm of infrared rays. However, if a beam emitted from a semiconductor laser at a wavelength of no greater than 450 nm is guided along a single-mode optical fiber having this structure, it is not possible to generate a beam having a single mode suitable for optical communications because the core diameter must be reduced dramatically based on the wavelength ratio when using a short-wavelength laser, requiring a reduction in the diameter of the mode propagating through the optical fiber, i.e., a diameter of the beam spot emitted from the optical fiber.

In order to manufacture an optical fiber in which the single mode can be generated, a parameter V must meet the following condition.

Equation (3)

$$V = \frac{2\pi a \sqrt{n_1^2 - n_2^2}}{\lambda} < 2.405 \quad (3)$$

Figure 4:
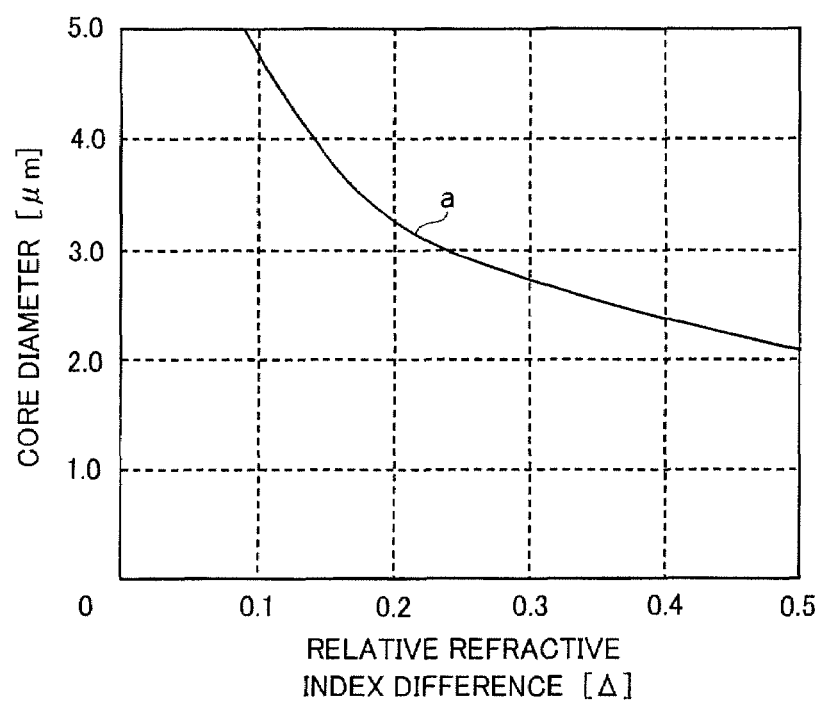
FIG. 4 is a graph showing the relationship between the relative refractive index difference and core diameter of a single-mode optical fiber.

Here, $\lambda$ is the wavelength of light, $2a$ is the core diameter, $n_1$ is the refractive index of the core, and $n_2$ is the refractive index of the clad. FIG. 4 is a graph showing Equation (3) in which the wavelength $\lambda$ is 405 nm and the refractive $n_2$ is 1.4696 for a common clad whose primary component is quartz glass. In this graph, $\Delta$ represents the relative refractive index difference and is expressed by the following equation.

Equation (4)

$$\Delta = \frac{n_1 - n_2}{n_2} \quad (4)$$

In FIG. 4, the single mode can be achieved in the region where the core diameter is smaller than the curve a. As can be seen from FIG. 4, the relative refractive index difference $\Delta$ must be reduced as much as possible in order to produce a single-mode optical fiber having a large core diameter. However, since the core diameter increases rapidly when the relative refractive index difference $\Delta$ is less than 0.1%, it is difficult to control the process and, thus, manufacturing of such an optical fiber is difficult. Further, confinement of the light (guiding light from the light source without light leaking externally) becomes more difficult as the relative refractive index difference $\Delta$ becomes smaller. In reality, the relative refractive index difference $\Delta$ is limited to about 0.1-0.2% (around 0.15%) and the core diameter to about 3.5 μm.

In the preferred embodiment, photonic crystal fibers are used as the optical fibers forming the optical fiber array unit 34 of the optical recording apparatus 20. The photonic crystal fibers emit beams having a larger mode field diameter $2\omega_F$.

FIGS. 5(A) and 5(B) are cross-sectional views of a photonic crystal fiber. As shown in FIGS. 5(A) and 5(B), the photonic crystal fibers are configured of an optical fiber 10 formed of a silica 11 and numerous air holes 13 arranged in regular patterns in the optical fiber 10. Light is confined in a core region 12 encompassed by the inner air holes 13 and propagates through this core region 12. The photonic crystal fiber shown in FIG. 5(B) has air holes 13 formed at regular intervals in the core region 12, which has a hexagonal cross section. The photonic crystal fiber shown in FIG. 5(A) has pairs of air holes 13 formed at regular intervals in the core region 12 having the same hexagonal cross section.

Unlike optical fibers of the conventional structure in which the waveguide structure is formed by using an additive in the quartz glass, these photonic crystal fibers have such features as a large mode field diameter and single-mode operations with coverage from the ultraviolet region to the infrared region. Examples of these optical fibers that are already being manufactured include LMA-8 (core diameter: 8.5±0.3 μm, mode field diameter: 6.0±1.0 μm) and LMA-10 (core diameter: 11.0±1.0 μm, mode field diameter: 8.5±1.0 μm) manufactured by the Crystal Fiber A/S, as well as LFR-127 (mode field diameter: 8.8/7.9 μm at 405 nm) manufactured by Mitsubishi Cable Industries. All of these optical fibers can be used as single-mode optical fibers having a large mode field diameter greater than 5 μm in the blue wavelength region of 450 nm or less.

As can be seen in Equation (2) described above, by increasing the mode field diameter $2\omega_F$ of laser beam emitted from optical fibers in the optical fiber array unit 34, it is possible to achieve a relative reduction in the magnification M of the optical system when fixing the scan line pitch $P_D$. As can be seen from Equation (1), by reducing the magnification M of the optical system, it is possible to reduce error in the scan line pitch caused by error in the sloped angle θ of the beam spot row.

Next, a method will be described for alleviating error in scan line pitch caused by angular error in the slope of beam spots formed on the scanning surface.

First, the allowable error in the scan line pitch $P_D$ formed on the scanning surface in the optical recording apparatus 20 using a plurality of beams will be described with reference to FIGS. 6 and 7.

FIG. 6 shows examples of scan lines in a five-beam optical scanning system, where FIG. 6(B) shows no error in the scan line pitch PD, while FIGS. 6(A) and 6(C) show an error of −10% and +10% respectively in the scan line pitch $P_D$ within one scan compared to the case in FIG. 6(B). FIG. 7 shows examples of scan lines in a ten-beam optical scanning system, where FIG. 7(B) shows no error in the scan line pitch $P_D$, while FIGS. 7(A) and 7(C) show an error of −5% and +5% respectively in the scan line pitch $P_D$ within one scan compared to the case in FIG. 7(B).

As is clear from FIGS. 6 and 7, the error in scan line pitch within one scan of a multibeam scan has a cumulative effect as error in the connecting regions (portions indicated by arrows in the drawings) between the $N^{th}$ scan and the $N+1^{th}$ scan (or between the $N+1^{th}$ scan and the $N+2^{th}$ scan). Hence, even an error of ±5% or ±10% produces scan line irregularities that can be clearly perceived by the eye.

The pitch error $\Delta P_D$ of the scan line pitch $P_D$ within one scan is 0.1 $P_D$ with an error of ±10% in FIG. 6 and 0.05 $P_D$ with an error of ±5% in FIG. 7. Hence, the value acquired for the pitch error $\Delta P_D$ clearly worsens the larger the number of beams. In a study conducted by the inventors of the present embodiment, irregularities in the scan line pitch became visually noticeable in the case of five beams when the scan line pitch $P_D$ produced an error of ±10% the normal pitch and became visually noticeable in the case of ten beams when the scan line pitch $P_D$ produced an error of ±5% the normal pitch. Considering these results, it is necessary to achieve a pitch error $\Delta P_D < 0.1\ P_D$ for five beams and a pitch error $\Delta P_D < 0.05\ P_D$ for ten beams as a guideline for the levels in which irregularities in scan line pitch are not noticeable. These results can be generalized to say that the following equation must be satisfied when scanning m beams.

Equation (5)

$$P_D < P_D/(2m) \quad (5)$$

However, by taking the total differential on both sides of Equation (1) with the magnification M of the optical system and the pitch $P_F$ of optical fibers forming the optical fiber array unit 34 as constants, we get pitch error $\Delta P_D = MP_F \cos\theta \cdot \Delta\theta$. By substituting Equation (2) into this equation, we obtain Equation (6) below.

Equation (6)

$$\Delta P_D = (2\omega_D/2\omega_F) P_F \cos\theta \cdot \Delta\theta \quad (6)$$

Here, $2\omega_F$ is the mode field diameter of laser beams emitted from the optical fibers in the optical fiber array; $2\omega_D$ is the spot diameter of beam spots focused on the scanning surface; and $\Delta\theta$ is the error in the sloped angle of the row of focused beam spots. The following equation is obtained by substituting Equation (6) into the left side of Equation (5) and Equations (1) and (2) into the right side.

$$(2\omega_D/2\omega_F) P_F \cos\theta \cdot \Delta\theta < (2\omega_D/2\omega_F) P_F \sin\theta/(2m)$$

This equation can be further arranged to obtain Equation (7) below.

Equation (7)

$$\theta > \tan^{-1}(2m \cdot \Delta\theta) \quad (7)$$

Further, by setting Equation (4) to $M=(2\omega_D/2\omega_F)$ and substituting this equation into Equation (1), we obtain Equation (8) below.

Equation (8)

$$2\omega_F = 2\omega_D(P_F/P_D)\sin\theta \quad (8)$$

Equation (9) is obtained by substituting Equation (7) having the $\theta$ terms into Equation (8).

Equation (9)

$$2\omega_F > 2\omega_D(P_F/P_D)\sin[\tan^{-1}(2m \cdot \Delta\theta)] \quad (9)$$

Since the optical recording apparatus 20 is normally adjusted with the goal of achieving a prescribed angular value, the error in the sloped angle $\Delta\theta$ can be viewed as the error remaining after adjustment or minimum step in angular adjustment determined by device performance, that is, the resolution for angle adjustments in the row of beam spots.

If the mode field diameter $2\omega_F$ of the optical fiber satisfies the expression (9) in the optical recording apparatus 20, even though $\Delta\theta \neq 0$, this indicates that irregularities in the scan line pitch can be kept to a level that is not noticeable.

While the angular error $\Delta\theta$ is the error remaining after adjustments or the resolution of adjustments to the sloped angle of the row of beam spots, as described above, keeping these values large eases error margin and is meaningful from the perspective of shortening the adjustment time and reducing the number of steps in adjustment.

A practical target for residual error is a $\Delta\theta$ of about 0.1°, or 0.0017 rad. If all variables in Equation (9) other than $\Delta\theta$ are left as variables, Equation (9) can be rewritten as shown below to find the conditions of an optical fiber mode field diameter needed to obtain good image quality without noticeable irregularities in scan line pitch.

Equation (10)

$$2\omega_F > 2\omega_D(P_F/P_D)\sin[\tan^{-1}(2m \cdot 0.0017)] \quad (10)$$

Assuming for example that $2\omega_D = 50$ μm, $P_F = 125$ μm, $P_D = 21.2$ μm, $m=5$, and $\Delta\theta = 0.1° = 0.0017$ rad, then according to Equations (9) and (10) $2\omega_F > 5.1$ μm. Hence, a mode field diameter $2\omega_F$ of the optical fiber is preferably 5.1 μm or greater to obtain quality images with no noticeable scan line irregularities.

As described above, by satisfying Equations (9) and (10) for the condition of the mode field diameter $2\omega_F$, the present embodiment can provide an optical recording apparatus capable of recording high-quality images with no noticeable irregularities in scan line pitch. The optical recording apparatus accomplishes this by alleviating error in scan line pitch caused by angular error in the slope of beam spots formed on the scanning surface, even in the short-wavelength region no greater than 450 nm.

While two examples (FIGS. 5A and 5B) of photonic crystal fiber structures were given in the preferred embodiment, it should be apparent that the present invention is not limited to these structures, but may employ all fibers having a regular arrangement of air holes for confining light to and propagating light in the core region. However, Equation (9) must be satisfied as a condition, regardless of which fiber is used. Further, Equation (10) must be satisfied as a condition when allowing $\Delta\theta = 0.1° = 0.0017$ rad as the residual error.

The present invention may also be applied to an optical recording apparatus using semiconductor lasers outside of the short-wavelength range to improve the quality of images formed with the optical recording apparatus. The present invention may also be applied to the optical system of a laser printer, an optical system for producing lithographic plates, and the like.

What is claimed is:

1. An optical recording apparatus comprising:
   a plurality of laser modules, each laser module comprising:
   a light source that generates a laser beam; and
   an optical fiber having an incident face and an output face, the optical fiber being arranged to receive the laser beam at the incident face,
   an optical fiber array unit that bundles a plurality of optical fibers configuring the plurality of laser modules to form an optical fiber array wherein the plurality of optical fibers is arranged to have an array of output faces arranged at a constant pitch;
   a photosensitive member having a photosensitive surface; and
   an optical system that scans laser beams outputted from the array of output faces of the optical fiber array in a first direction on the photosensitive surface, the laser beams forming dots aligned in a second direction to form an angle with respect to the first direction, wherein a relationship of $2\omega_F > 2\omega_D(P_F/P_D)\sin[\tan^{-1}(2m\cdot\Delta\theta)]$ is established, where $2\omega_F$ is a mode field diameter of the laser beams outputted from the optical fiber array, $2\omega_D$ is a spot diameter of the laser beams on the scanning surface, $P_F$ is a pitch of the output faces of the optical fibers, $P_D$ is a pitch of scan lines on the scanning surface, m is the number of the laser beams, and $\Delta\theta$ is adjusting resolution for the angle of the array of the laser beams on the scanning surface.

2. The optical recording apparatus according to claim 1, wherein the optical fiber is a single-mode optical fiber formed from photonic crystals.

3. The optical recording apparatus according to claim 2 wherein the optical fiber has a core region formed with a plurality of air holes formed at regular intervals, and wherein light is confined in the core region encompassed by the plurality of air holes and propogates through the region.

4. The optical recording apparatus according to claim 1, wherein the light source comprises a semiconductor laser that is configured to emit light in a wavelength of 450 nm or less.

5. An optical recording apparatus comprising:
a plurality of laser modules, each laser module comprising:
a light source that generates a laser beam; and
an optical fiber having an incident face and an output face, the optical fiber being arranged to receive the laser beam at the incident face,
an optical fiber array unit that bundles a plurality of optical fibers configuring the plurality of laser modules to form an optical fiber array wherein the plurality of optical fibers is arranged to have an array of output faces arranged at a constant pitch;
a photosensitive member having a photosensitive surface; and
an optical system that scans laser beams outputted from the array of output faces of the optical fiber array in a first direction on the photosensitive surface, the laser beams forming dots aligned in a second direction to form an angle with respect to the first direction, wherein a relationship of $2\omega_F > 2\omega_D(P_F/P_D)\sin[\tan^{-1}(2m\cdot 0.0017)]$ is established, where $2\omega_F$ is a mode field diameter of the laser beams outputted from the optical fiber array, $2\omega_D$ is a spot diameter of the laser beams on the scanning surface, $P_F$ is a pitch of the output faces of the optical fibers, $P_D$ is a pitch of scan lines on the scanning surface, m is the number of the laser beams, and 0.0017 is the value of the adjusting resolution $\Delta\theta$ for the angle of the array of the laser beams on the scanning surface.

6. The optical recording apparatus according to claim 5, wherein the optical fiber is a single-mode optical fiber formed from photomic crystals.

7. The optical recording apparatus according to claim 5, wherein the light source comprises a semiconductor laser that is configured to emit light in a wavelength of 450 nm or less.

* * * * *

UNITED STATES PATENT AND TRADEMARK OFFICE
CERTIFICATE OF CORRECTION

PATENT NO. : 7,439,998 B2  Page 1 of 1
APPLICATION NO. : 11/748110
DATED : October 21, 2008
INVENTOR(S) : Shibayama It is certified that error appears in the above-identified patent and that said Letters Patent is hereby corrected as shown below:

Title page of the patent, Item (30) Foreign Application Priority Data please correct priority date as May 15, 2006 for P2006-134874.

Signed and Sealed this

Thirtieth Day of December, 2008

JON W. DUDAS
*Director of the United States Patent and Trademark Office*